United States Patent
Che et al.

(10) Patent No.: US 12,200,351 B2
(45) Date of Patent: Jan. 14, 2025

(54) PHOTOGRAPHING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Wanli Che, Beijing (CN); Zhenan Li, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/750,915

(22) Filed: Jun. 21, 2024

(65) Prior Publication Data

US 2024/0348914 A1     Oct. 17, 2024

Related U.S. Application Data

(63) Continuation of application No. PCT/CN2023/079003, filed on Mar. 1, 2023.

(30) Foreign Application Priority Data

Mar. 2, 2022   (CN) .......................... 202210200351.1

(51) Int. Cl.
*H04N 23/63*     (2023.01)
*H04N 23/61*     (2023.01)
*H04N 23/62*     (2023.01)

(52) U.S. Cl.
CPC .......... *H04N 23/632* (2023.01); *H04N 23/61* (2023.01); *H04N 23/62* (2023.01); *H04N 23/633* (2023.01)

(58) Field of Classification Search
CPC .... H04N 23/632; H04N 23/61; H04N 23/633; H04N 23/62
(Continued)

(56) References Cited

U.S. PATENT DOCUMENTS 9,554,049 B2 *   1/2017   Tobin .................... H04N 23/631
9,942,484 B2 *   4/2018   Pan ......................... G06F 3/0482
(Continued)

FOREIGN PATENT DOCUMENTS

CN     107896304 A     4/2018
CN     109495684 A     3/2019
(Continued)

OTHER PUBLICATIONS

International Patent Application No. PCT/CN2023/079003; Int'l Search Report; dated May 23, 2023; 3 pages.
(Continued)

*Primary Examiner* — Pritham D Prabhakher
(74) *Attorney, Agent, or Firm* — BakerHostetler (57) ABSTRACT

Disclosed in embodiments of the present disclosure are a photographing method and apparatus, an electronic device, and a storage medium. The method includes: in response to a first triggering operation for a preset control on a first photographing page, displaying a first preset interface, wherein the first preset interface comprises a plurality of first template identifiers and a first photographing control; in response to a second triggering operation acting on a target template identifier, applying a photographing template associated with the target template identifier to a photographing object; in response to an operation acting on the first photographing control, concealing the first preset interface, displaying a second photographing page, and displaying a timing identifier on the second photographing page; and if the timing identifier is updated as a preset identifier, photographing the photographing object on the basis of the photographing template.

20 Claims, 7 Drawing Sheets

(58) Field of Classification Search
USPC .................................................. 348/333.01
See application file for complete search history.

(56) References Cited

U.S. PATENT DOCUMENTS

| | | | | |
|---|---|---|---|---|
| 10,015,400 | B2* | 7/2018 | Kim | H04N 23/6811 |
| 11,500,454 | B2* | 11/2022 | Lavreka | G06F 3/0482 |
| 11,930,268 | B2* | 3/2024 | Zhao | G06F 3/0488 |
| 2011/0050956 | A1* | 3/2011 | Bessho | H04N 23/61 |
| | | | | 348/231.3 |
| 2014/0152875 | A1* | 6/2014 | Tobin | H04N 23/635 |
| | | | | 348/239 |
| 2016/0366344 | A1* | 12/2016 | Pan | H04N 23/62 |
| 2017/0134647 | A1* | 5/2017 | Tobin | H04N 23/64 |
| 2017/0180646 | A1* | 6/2017 | Kim | H04N 23/6811 |
| 2018/0091660 | A1* | 3/2018 | Lu | G06F 3/04817 |
| 2021/0360168 | A1* | 11/2021 | Zhao | H04N 5/265 |
| 2021/0389873 | A1* | 12/2021 | Chen | G06F 3/0412 |
| 2022/0206563 | A1* | 6/2022 | Lavreka | H04L 51/10 |
| 2022/0300081 | A1* | 9/2022 | Eirinberg | G06V 40/107 |
| 2022/0300732 | A1* | 9/2022 | Eirinberg | G06F 3/017 |
| 2022/0394191 | A1 | 12/2022 | Wang et al. | |
| 2024/0078638 | A1 | 3/2024 | Liao et al. | |
| 2024/0089585 | A1 | 3/2024 | Zhang et al. | |

FOREIGN PATENT DOCUMENTS

| | | |
|---|---|---|
| CN | 110891144 A | 3/2020 |
| CN | 111050076 A | 4/2020 |
| CN | 111601039 A | 8/2020 |
| CN | 111818263 A | 10/2020 |
| CN | 306182373 S | 11/2020 |
| CN | 112135059 A | 12/2020 |
| CN | 112486390 A | 3/2021 |
| CN | 112817494 A | 5/2021 |
| CN | 113093968 A | 7/2021 |
| CN | 113225483 A | 8/2021 |
| CN | 113473019 A | 10/2021 |
| CN | 114598815 A | 6/2022 |
| JP | 2009-246822 A | 10/2009 |
| WO | WO 2014/133288 A1 | 9/2014 |
| WO | WO 2021/129640 A1 | 7/2021 |

OTHER PUBLICATIONS

China Patent Application No. 202210200351.1; Office Action; dated Apr. 3, 2023; 12 pages.
China Patent Application No. 202210200351.1; Second Office Action; dated Jul. 4, 2023; 14 pages.
China Patent Application No. 202210200351.1; Notification to Grant; Dec. 5, 2023; 6 pages.

* cited by examiner

PHOTOGRAPHING METHOD AND APPARATUS, ELECTRONIC DEVICE, AND STORAGE MEDIUM

CROSS-REFERENCE TO RELATED APPLICATIONS

This application is a continuation of International Patent Application No. PCT/CN2023/079003, filed on Mar. 1, 2023, which is based on and claims the benefit of priority to the CN application No. 202210200351.1 filed on Mar. 2, 2022, which are hereby incorporated by reference in their entireties into the present application.

TECHNICAL FIELD

The present disclosure relates to the technical field of information technology, and in particular, a shooting method, device, apparatus, electronic device and storage medium.

BACKGROUND

With rapid development of network technology and mobile terminal technology, there are more and more applications that are suitable for mobile terminals. For example, video applications, based on which a user can browse videos, record videos or shoot images, etc.

SUMMARY

Some embodiments of the present disclosure provide a shooting method, comprising:
- displaying a first preset interface, in response to a first trigger operation for a preset control on a first shooting page, the first preset interface comprising a plurality of first template identifiers and a first shooting control, wherein the plurality of first template identifiers are determined based on a shooting object displayed on the first shooting page;
- applying, in response to a second trigger operation on a target template identifier, a shooting template associated with the target template identifier to the shooting object to display a preview effect corresponding to the shooting template on the first shooting page;
- hiding the first preset interface, displaying a second shooting page, and displaying a timing identifier on the second shooting page, in response to an operation on the first shooting control; and
- shooting the shooting object based on the shooting template, in response to the timing identifier being updated to a preset identifier.

Some embodiments of the present disclosure further provide a shooting apparatus, comprising:
- a first displaying module configured to display a first preset interface, in response to a first trigger operation for a preset control on a first shooting page, the first preset interface comprising a plurality of first template identifiers and a first shooting control;
- a processing module configured to apply, in response to a second trigger operation on a target template identifier, a shooting template associated with the target template identifier to the shooting object to display a preview effect corresponding to the shooting template on the first shooting page, wherein the second trigger operation acts on the target template identifier selected from the plurality of first template identifiers;
- a second displaying module configured to hide the first preset interface, display a second shooting page, and display a timing identifier on the second shooting page, in response to an operation on the first shooting control; and
- a shooting module configured to shoot the shooting object based on the shooting template, in response to the timing identifier being updated to a preset identifier.

Some embodiments of the present disclosure further provide an electronic device, the electronic device comprising:
- one or more processors; and
- a storage device for storing one or more programs;
- When the one or more programs are executed by the one or more processors, the one or more processors are caused to realize the shooting method as described above.

Some embodiments of the present disclosure further provide a non-transitory computer-readable storage medium, on which a computer program is stored, and the computer program, when executed by a processor, realizes the shooting method as mentioned above.

Some embodiments of the present disclosure further provide a computer program product comprising a computer program or instruction which, when executed by a processor, realizes the shooting method as mentioned above.

Some embodiments of the present disclosure further provide a computer program, comprising an instruction which, when executed by a processor, causes the processor to execute the shooting method according to any embodiment of the present disclosure.

BRIEF DESCRIPTION OF THE DRAWINGS

The above and other features, advantages and aspects of embodiments of the present disclosure will become more apparent by referring to the following preferred embodiments in conjunction with the accompanying drawings. Throughout the drawings, identical or similar reference numerals denote identical or similar elements. It should be understood that the drawings are schematic, and units and elements are not necessarily drawn to scale.

DETAILED DESCRIPTION

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are used only for illustrative purposes, and are not used to limit the protection scope of the present disclosure.

It should be understood that steps described in the method embodiments of the present disclosure may be executed in different sequences and/or in parallel. Further, method embodiments may comprise additional steps and/or omit execution of illustrated steps. Scope of the present disclosure is not limited in this respect.

As used herein, the term "comprising" and its variants are open-ended comprising, that is, "comprising but not limited to". The term "based on" is "at least partially based on". The term "one embodiment" means "at least one embodiment"; the term "another embodiment" means "at least one other embodiment"; the term "some embodiments" means "at least some embodiments". Related definitions of other terms will be given in the below description.

It should be noted that such concepts as "first", "second" etc. mentioned in the present disclosure are only used to distinguish different devices, modules or units, and are not used to limit the order or interdependence of functions performed by these devices, modules or units.

It should be noted that such modifiers as "a" and "a plurality" mentioned in this disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

As mentioned above, how to improve the user's operation convenience when recording video or shooting images is one of the technical problems that need to be solved.

In order to solve the above technical problems or at least partially solve the above technical problems, the embodiments of the present disclosure provide a shooting method, device, electronic device and storage medium, which improve the shooting convenience and is advantageous to the improvement of the user experience.

Figure 1:
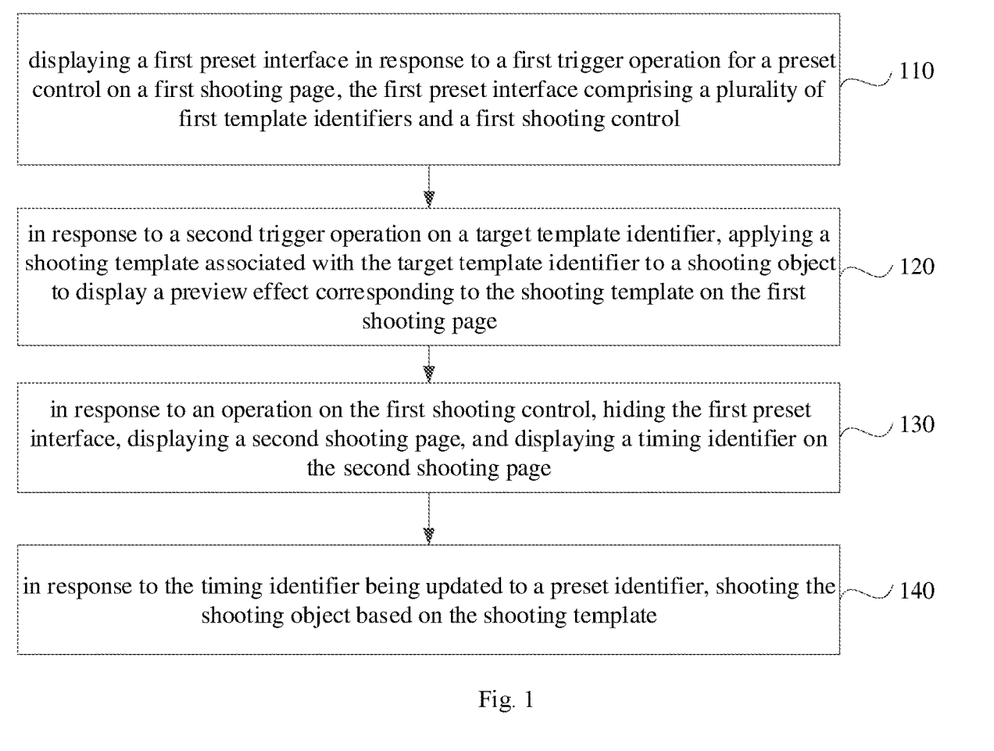
FIG. 1 is a flowchart of a shooting method in some embodiments of the present disclosure.

FIG. 1 is a flowchart of a shooting method in some embodiments of the present disclosure. The embodiments are applied to the shooting of videos or images in the client. The method can be executed by a shooting apparatus, which apparatus may be implemented in softwares and/or hardwares. The apparatus may be fitted in an electronic device, such as a terminal, comprising but not limited to smart phones, handheld computers, tablet computers, wearable devices with display screens, desktops, notebook computers, all-in-one machines, smart home devices and the like.

As shown in FIG. 1, the method comprises steps of the following.

Step 110: displaying a first preset interface, in response to a first trigger operation for a preset control on a first shooting page, the first preset interface comprising a plurality of first template identifiers and a first shooting control.

Figure 2:
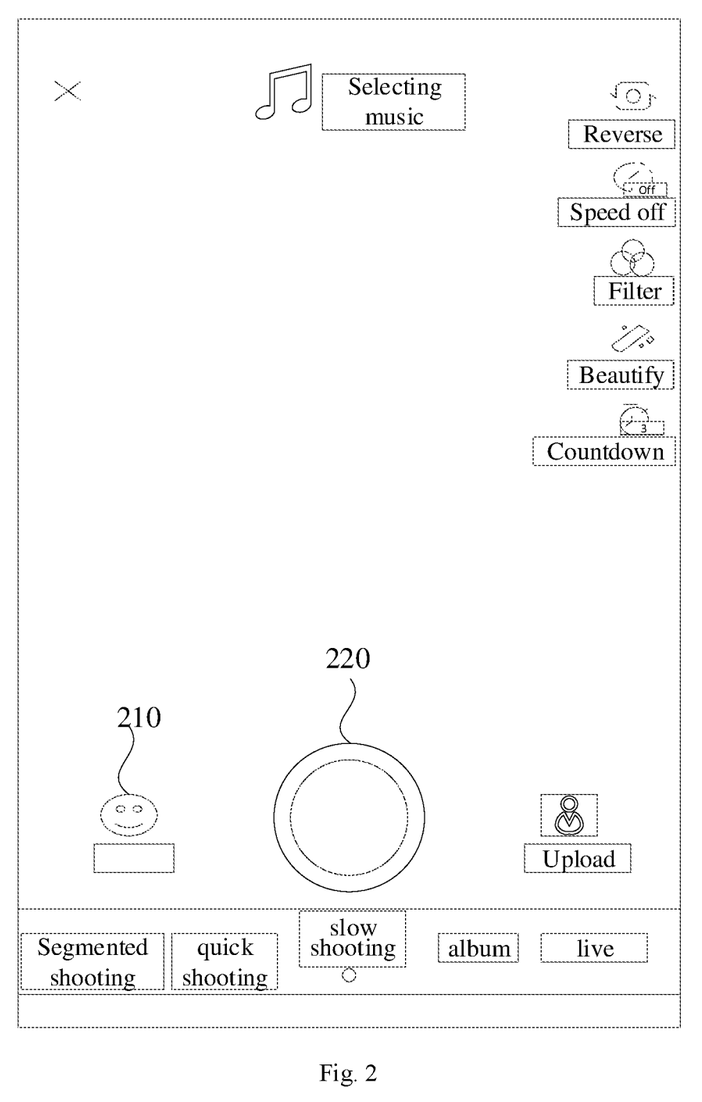
FIG. 2 is a schematic diagram of a first shooting page in some embodiments of the present disclosure.

Exemplarily, referring to the schematic diagram of some embodiments of a first shooting page as shown in FIG. 2, the first shooting page comprises a preset control 210 and a shooting control 220, and the user may enter the shooting state by triggering the shooting control 220. However, the shooting template provided by the system cannot be applied by triggering the shooting control 220 to enter the shooting state, and a video or image obtained by shooting is the original video or image without editing.

For example, the shooting template is for configuring an image editing operation performed on the original image material, so that the new image material generated after the original image material is edited according to the image editing operation presents an image editing effect corresponding to the shooting template. Therefore, if the user selects, for example, a shooting template before shooting, the video or image obtained by shooting can be presented with effects, and the effect of the shot video or image obtained by shooting can be improved.

By providing the user with a plurality of optional shooting templates, the user may quickly shoot videos or images with better effects, which can reduce shooting difficulty and improve shooting convenience and user experience.

In response to the user triggering the preset control 210, a first preset interface is displayed. As shown in the schematic diagram of some embodiments of a first preset interface in FIG. 3, the first preset interface 300 comprises a plurality of first template identifiers 310 and a first shooting control 320. The plurality of first template identifiers 310 are determined based on the shooting object displayed on the first shooting page, that is, the playback of the plurality of first template identifiers 310 are personalized according to the shooting object displayed on the first shooting page. For example, in response to the shooting object displayed on the first shooting page being a person, the plurality of first template identifiers 310 displayed on the first preset interface may be templates suitable for image editing of a person; in response to the shooting object displayed on the first shooting page being a plant, the plurality of first template identifiers 310 displayed on the first preset interface may be templates suitable for image editing of plants, and so on.

Figure 3:
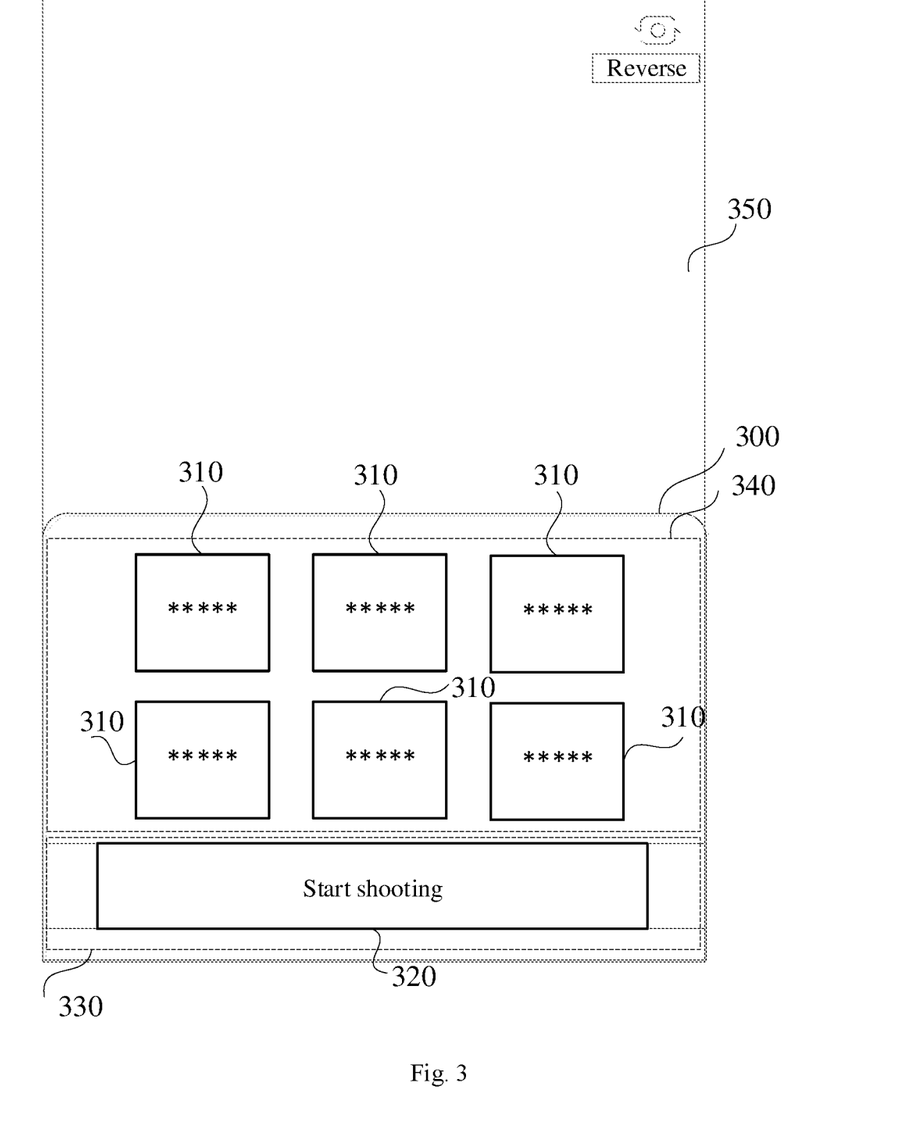
FIG. 3 is a schematic diagram of a first preset page in some embodiments of the present disclosure.

According to the shooting object displayed on the first shooting page, a plurality of first template identifiers 310 are displayed in a personalized manner, and each of the plurality of first template identifiers 310 is associated with a shooting template. Therefore, the user may be provided with a shooting template that is more suitable for the current shooting object to reduce the shooting difficulty and improve the shooting experience of the user.

In some embodiments, the display area 330 of the first shooting control 320 on the first preset interface 300 is different from the display area 340 of the plurality of first template identifiers 310 on the first preset interface 300, so as to avoid the first shooting control 320 from obscuring the first template identifiers 310. That is, the first shooting control 320 is not displayed superimposed on the first template identifier 310, and the first shooting control 320 dose not block any of the first template identifiers 310, thus improving the interactive experience of the user.

In some embodiments, a background of the display area 340 of the plurality of first template identifiers 310 on the first preset interface 300 is transparent, that is, a bottom page 350 can be seen through the display area 340, so as to minimize the obstruction caused by the first preset interface 300 to the bottom page 350 and achieve the purpose of improving the user interaction experience.

For example, the background of the display area 340 is transparent, and the background of the display area 340 may be colored or colorless.

Step 120: in response to a second trigger operation on a target template identifier, applying a shooting template associated with the target template identifier to the shooting object to display a preview effect corresponding to the shooting template on the first shooting page. The second trigger operation is configured to select the target template identifier from the plurality of first template identifiers.

Figure 4:
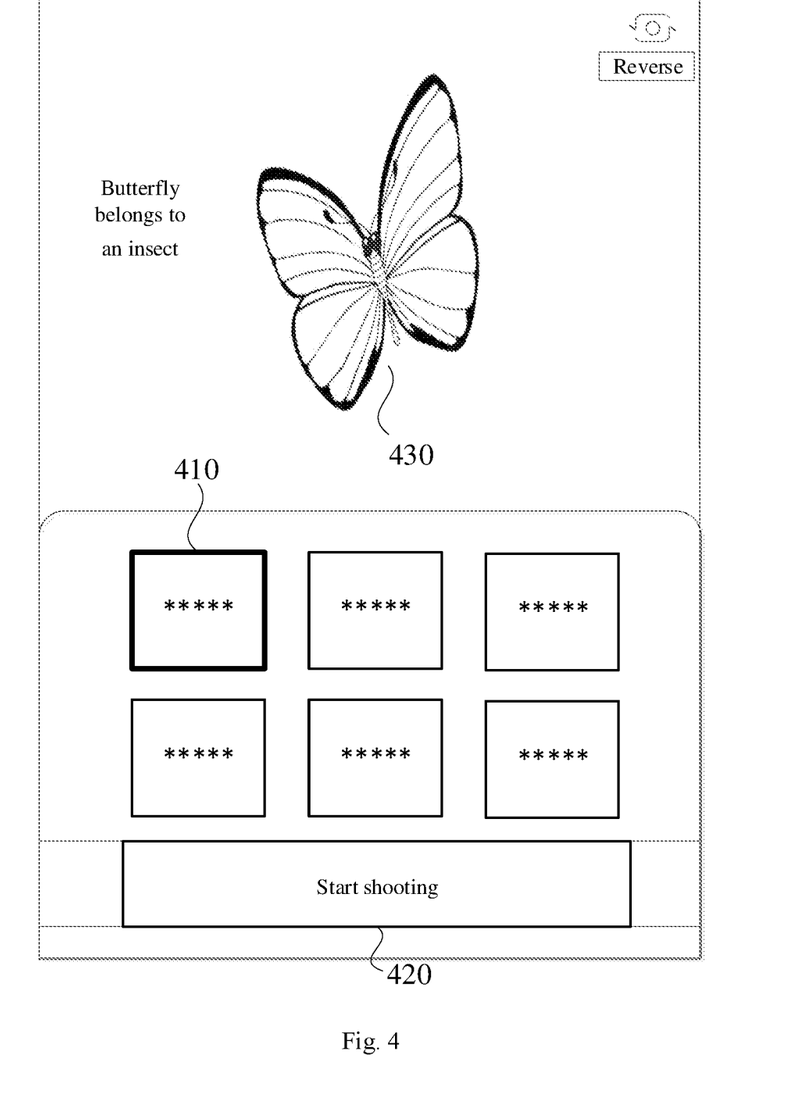
FIG. 4 is a schematic diagram of a first shooting page in some further embodiments of the present disclosure.

FIG. 4 is a schematic diagram of some further embodiments of a first shooting page. Taking a butterfly as an example, assuming that the user triggers the target template identifier 410, the shooting template associated with the target template identifier 410 is applied to the shooting object 430 to display the preview effect corresponding to the shooting template associated with the target template identifier 410 on the first shooting page.

Exemplarily, the shooting template comprises at least description information of the shooting object. The description information of the shooting object may comprise the name, attribute information and the like of the shooting object. For example, "butterfly belongs to insects", the user may add the description information "butterfly belongs to insects" to the "butterfly" image shot only by selecting the target template logo 410, which improves the shooting effect, reduces the shooting difficulty and helps to improve the shooting experience of the user. The user can select a template identifier satisfied from a plurality of template identifiers by browsing the preview effect corresponding to each of the plurality of template identifiers, and then, can directly enter the shooting state by triggering a "Start Shooting" control 420 without switching interfaces.

It needs to be noted that the embodiments of the present disclosure can configure various types of description information for the shooting object based on requirements, and the embodiments of the present disclosure does not limit in this respect.

In some embodiments, the shooting template further comprises at least one of an audio resource, a prop resource or an interactive resource, so that the image or video shot based on the shooting template carries at least one of an audio resource, a prop resource or an interactive resource. The audio resource may comprise sound effects or music; the prop resource refer to a prop used for shooting, such as "Tiger Head", "Cat Ear" etc.; the interactive resource refer to the resource used to realize interactive functions based on interactive controls, such as purchase links of shooting objects, purchase controls, etc.

For example, the applying the shooting template associated with the target template identifier to the shooting object to display a preview effect corresponding to the shooting template on the first shooting page, comprises:

Editing the shooting object according to an image editing operation configured by the shooting template to make the shooting object edited present an image editing effect corresponding to the shooting template.

In some embodiments, in response to the shooting object being detected to appear on the first shooting page, determining an attribute feature of the shooting object; determining the plurality of first template identifiers based on the attribute feature of the shooting object. The attribute feature comprises, for example, a category to which the shooting object belongs (such as person, plant, animal, etc.) or some more detailed features, such as long hair, short hair, whether to wear glasses, etc. By determining the plurality of first template identifiers based on the attribute feature of the shooting object, the purpose of personalized recommendation according to the shooting object can be realized, thus improving the shooting efficiency.

In some embodiments, in order to reserve a period of time for the user to adjust the shooting angle or do other shooting preparation work, the user enters the timing state after triggering the "Start Shooting" control 420; in response to the timing time reaching a preset time, the shooting state is entered.

Step 130: in response to an operation on the first shooting control, hiding the first preset interface, displaying a second shooting page, and displaying a timing identifier on the second shooting page.

Step 140: in response to the timing identifier being updated to a preset identifier, shooting the shooting object based on the shooting template.

Figure 5:
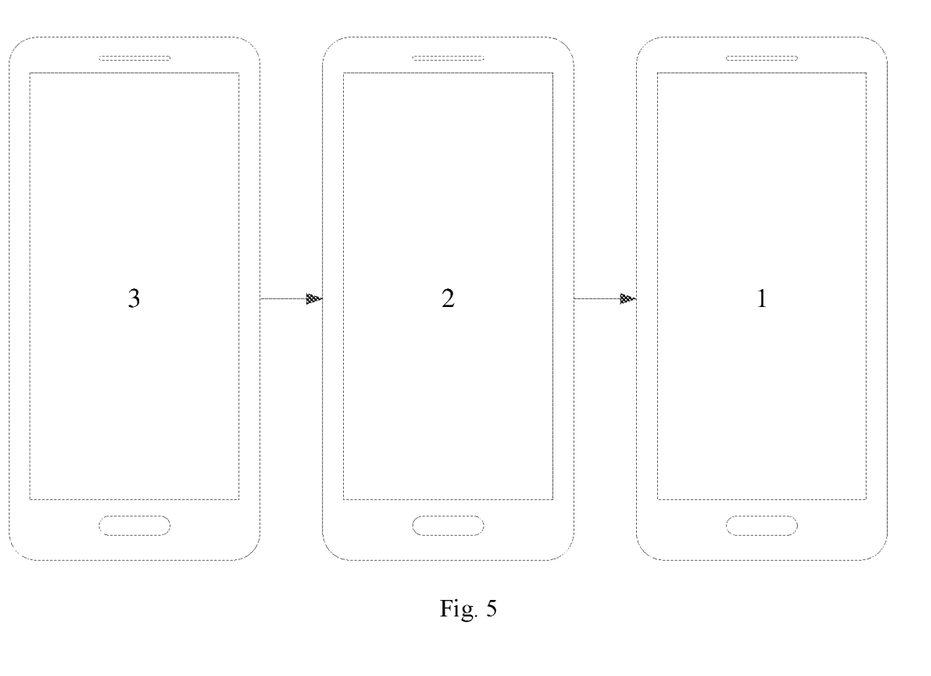
FIG. 5 is a schematic diagram of a second shooting page in some embodiments of the present disclosure.

The timing mode may be countdown. For example, for a countdown of 3 s, timing numbers 3-2-1 are sequentially displayed on the first shooting page, and then the shooting state is entered, as shown in the schematic diagram of some embodiments of a second shooting page in FIG. 5. The timing mode may also be positive timing. For example, for a positive timing of 3 s, timing numbers 1-2-3 are sequentially displayed on the first shooting page, and then the shooting state is entered.

By setting a time delay before the actual shooting, the user may be provided with time to adjust the shooting angle or make other preparations for shooting, so that the user may have time to prepare mentally, thus achieving the purpose of improving shooting quality and shooting efficiency.

Compared with related arts, the technical solution provided by the embodiments of the present disclosure has at least the following advantages: according to the shooting method provided by the embodiments of the present disclosure, on the first preset interface, besides displaying a plurality of first template identifiers, the first shooting control is also displayed, so that in response to a user selecting a first template identifier, for example, the shooting state can be directly entered through the first shooting control without interface switching; and a timing period is set before the actual shooting, which is convenient for the user to adjust the shooting angle and preview the shooting effect, thus achieving the purpose of improving shooting convenience and user experience and improving shooting efficiency.

In some embodiments, in order to reduce the use difficulty, the first shooting control is associated with first preset prompt information to prompt the user to enter the shooting state by triggering the first shooting control. For example, the first preset prompt information may be "start shooting", such as the first preset prompt information associated with the shooting control 320 shown in FIG. 3 and the first preset prompt information associated with the shooting control 420 shown in FIG. 4.

Figure 6:
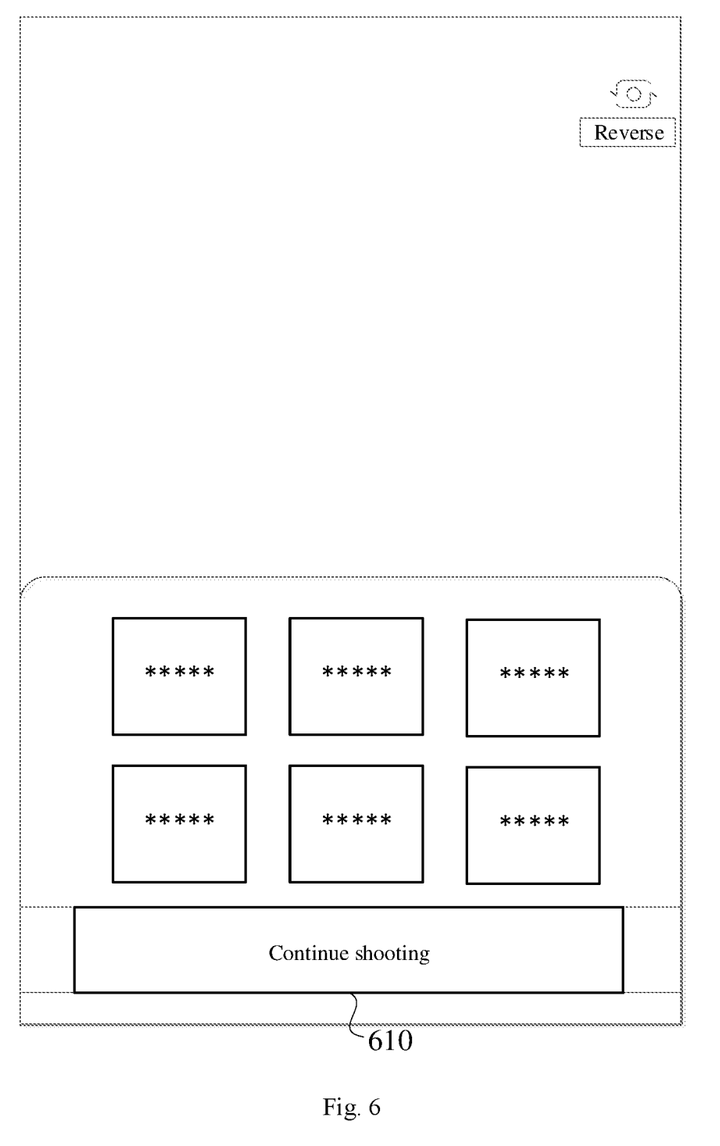
FIG. 6 is a schematic diagram of a second preset page in some embodiments of the present disclosure.

In some embodiments, in response to the shooting mode being a segmented shooting mode, after shooting the shooting object based on the shooting template, displaying a second preset interface on the first shooting page in response to a third trigger operation for a preset control on a first shooting page, wherein the second preset interface comprises a plurality of second template identifiers and a second shooting control, and the second shooting control is associated with second preset prompt information which is different from the first preset prompt information. The second preset prompt information is, for example, "Continue shooting", as shown in the schematic diagram of some embodiments of a second preset interface shown in FIG. 6, in which a second shooting control 610 is associated with the second preset prompt information "Continue shooting". In some embodiments, in response to the user triggering the second shooting control, the timing state is still entered first, and in response to the timing time being up, the shooting state is entered to start shooting.

The segmented shooting mode may be that videos shot at different times are spliced together to generate a continuous video. For example, in response to the duration of the video shot for the first time being 4 s and the duration of the video shot for the second time being 6 s, the video shot for the first time and the video shot for the second time are spliced into a continuous video with the duration of 10 s, and the video shot for the first time is played in the first 4 s and the video shot for the second time is played in the last 6 s.

According to the shooting method provided by the embodiments of the present disclosure, in the preset interface displaying the first template identifiers, in addition to displaying a plurality of first template identifiers, the first shooting control is also displayed. As so, in response to a user selecting a first template identifier, the shooting state can be directly entered through the first shooting control without interface switching; and a timing period is set before the actual shooting, which is convenient for the user to adjust the shooting angle and preview the shooting effect, thus achieving the purpose of improving shooting convenience and user experience and improving shooting efficiency.

Figure 7:
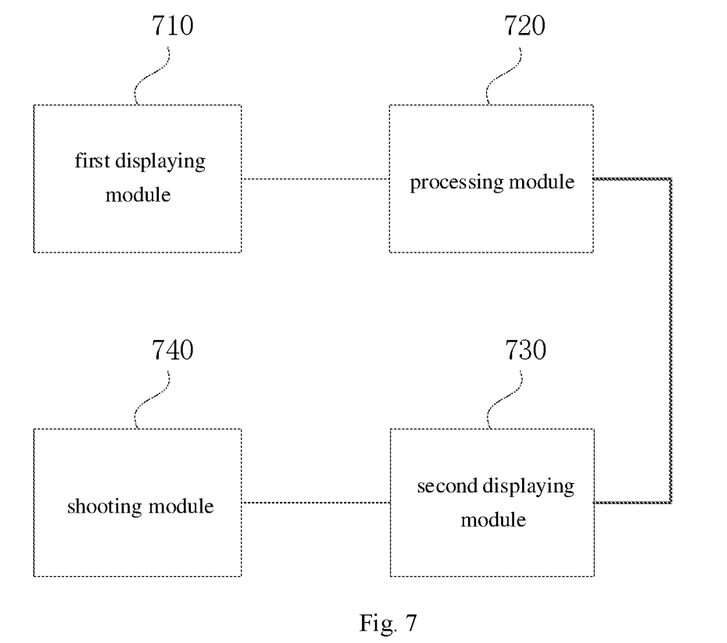
FIG. 7 is a structural schematic diagram of a shooting apparatus in some embodiments of the present disclosure.

FIG. 7 is a structural schematic diagram of a shooting apparatus in some embodiments of the present disclosure. The shooting apparatus provided by the embodiments of the present disclosure can be fitted in a client. The shooting apparatus comprises specifically a first display module 710, a processing module 720, a second display module 730 and a shooting module 740.

The first displaying module 710 is configured to display a first preset interface in response to a first trigger operation for a preset control on a first shooting page, the first preset interface comprising a plurality of first template identifiers and a first shooting control; the processing module 720 is configured to, in response to a second trigger operation on a target template identifier, apply a shooting template associated with the target template identifier to the shooting object to display a preview effect corresponding to the shooting template on the first shooting page, wherein the second trigger operation acts on the target template identifier selected from the plurality of first template identifiers; the second displaying module 730 is configured to, in response to an operation on the first shooting control, hide the first preset interface, display a second shooting page, and display a timing identifier on the second shooting page; the shooting module 740 is configured to, in response to the timing identifier being updated to a preset identifier, shooting the shooting object based on the shooting template.

In some embodiments, the first shooting control is associated with first preset prompt information.

In some embodiments, in response to a shooting mode is a segmented shooting mode, the first displaying module 710 is further configured to display a second preset interface, in response to a third trigger operation for a preset control on the first shooting page, the second preset interface comprising a plurality of second template identifiers and a second shooting control, and the second shooting control being associated with second preset prompt information which is different from the first preset prompt information.

In some embodiments, a display area of the first shooting control on the first preset interface is different from a display area of the plurality of first template identifiers on the first preset interface, and the first shooting control does not obscure any of the plurality of first template identifiers.

In some embodiments, a background of the display area of the plurality of first template identifiers on the first preset interface is transparent.

In some embodiments, the shooting template comprises at least description information of the shooting object.

In some embodiments, the shooting template further comprises at least one of an audio resource or an interactive resource.

In some embodiments, the processing module 720 is configured to edit the shooting object according to an image editing operation configured by the shooting template to make the shooting object edited present an image editing effect corresponding to the shooting template.

In some embodiments, the device further comprises: a determining module configured to determine an attribute feature of the shooting object, in response to the shooting object being detected to appear on the first shooting page; determine the plurality of first template identifiers based on the attribute feature of the shooting object.

The shooting apparatus provided by the embodiments of the present disclosure can execute steps executed by the client in the shooting method provided by the embodiment of the present disclosure, and has execution steps and advantageous effects, which will not be repeated here.

Figure 8:
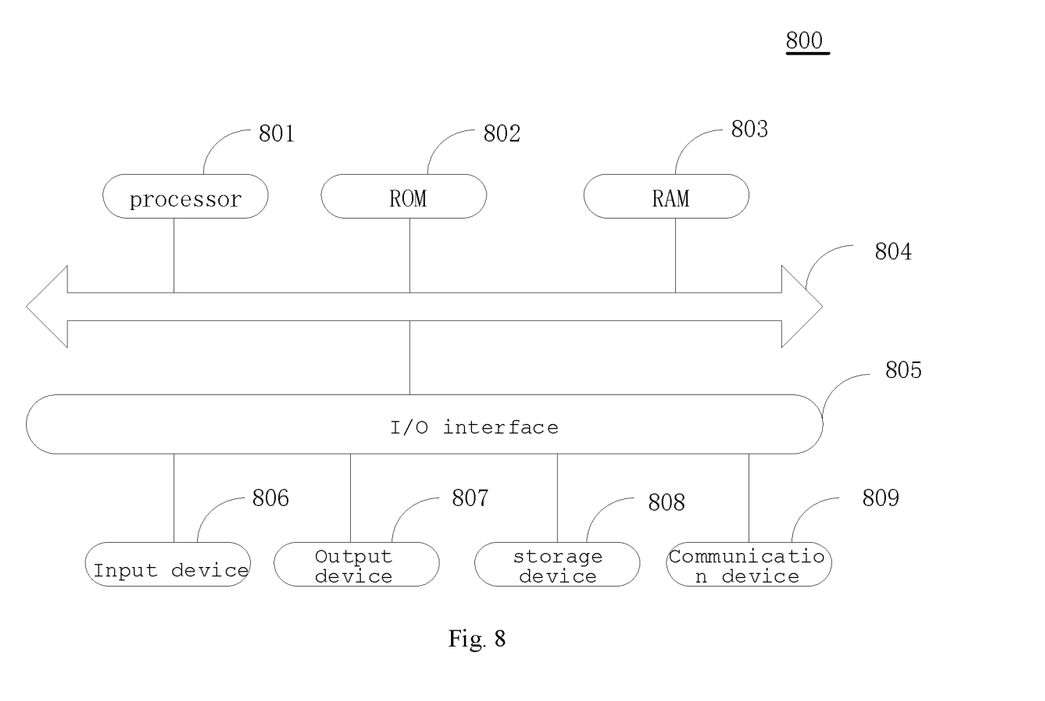
FIG. 8 is a structural schematic diagram of an electronic device in some embodiments of the present disclosure.

FIG. 8 is a structural schematic diagram of an electronic device in some embodiments of the present disclosure. Referring specifically to FIG. 8, there is shown a structural schematic diagram of an electronic device 800 adapted for implementing an embodiment of the present disclosure. The electronic device 800 in the embodiment of the present disclosure may comprise, but is not limited to, a mobile terminal such as a mobile phone, a notebook computer, a digital broadcast receiver, a PDA (Personal Digital Assistant), a PAD (Tablet Computer), a PMP (Portable Multimedia Player), a vehicle-mounted terminal (such as a vehicle-mounted navigation terminal), a wearable electronic device and the like, and a fixed terminal such as a digital TV, a desktop computer, a smart home device and the like. The electronic device shown in FIG. 8 is only an example, and should not be construed to limit function and application scope of the embodiment of the present disclosure.

As shown in FIG. 8, an electronic device 800 may comprise a processor (e.g., a central processor, a graphics processor, etc.) 801, which may perform various appropriate actions and processes according to a program stored in a read-only memory (ROM) 802 or a program loaded into a random access memory (RAM) 803 from a storage device 808 to realize a method according to the embodiment of the present disclosure. In the RAM 803, various programs and data required for operation of the electronic device 800 are also stored. The processor 801, the ROM 802 and the RAM 803 are connected to each other through a bus 804. An input/output (I/O) interface 805 is also connected to the bus 804.

Generally, the following devices can be connected to the I/O interface 805: an input device 806 comprising, for example, a touch screen, a touch pad, a keyboard, a mouse, a camera, a microphone, an accelerometer, a gyroscope, etc.; an output device 807 comprising, for example, a liquid crystal display (LCD), a speaker, a vibrator, etc.; a storage device 808 comprising, for example, a magnetic tape, a hard disk, etc.; and a communication device 809. The communication device 809 may allow the electronic device 800 to communicate wirelessly or wired with other devices to exchange data. Although FIG. 8 shows an electronic device 800 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, the embodiment of the present disclosure comprises a computer program product comprising a computer program carried on a non-transient computer-readable medium, the computer program comprising program codes for executing the method shown in the flowchart, thereby realizing the shooting method as described above. In such an embodiment, the computer program can be downloaded and installed from the network through the communication device 809, or installed from the storage device 808, or installed from the ROM 802. When the computer program is executed by the processor 801, the above function defined in the method of the embodiment of the present disclosure is performed.

It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device or unit, or any combination of the above. More examples of computer-readable storage media may comprise, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which program can be used by or in combination with an instruction execution system, device or unit. In the present disclosure, a computer-readable signal medium may comprise a data signal propagated in baseband or as part of a carrier wave, in which computer-readable program codes are carried. This propagated data signal can take many forms, comprising but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program codes contained in the computer-readable medium can be transmitted by any suitable medium, comprising but not limited to: a wire, an optical cable, a RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication network comprise a local area network ("LAN"), a wide area network ("WAN"), an internet (for example, the Internet) and an end-to-end network (for example, ad hoc end-to-end network), as well as any currently known or future developed network.

The computer-readable medium may be comprised in the electronic device; or it can exist independently without being assembled into the electronic device.

The computer-readable medium carries one or more programs, which, when executed by the electronic device, cause the electronic device to display a first preset interface in response to a first trigger operation for a preset control on a first shooting page, the first preset interface comprising a plurality of first template identifiers and a first shooting control; in response to a second trigger operation on a target template identifier, apply a shooting template associated with the target template identifier to the shooting object to display a preview effect corresponding to the shooting template on the first shooting page, wherein the second trigger operation acts on the target template identifier selected from the plurality of first template identifiers; in response to an operation on the first shooting control, hide the first preset interface, display a second shooting page, and display a timing identifier on the second shooting page; when the timing identifier is updated to a preset identifier, shoot the shooting object based on the shooting template.

In some embodiments, when said one or more programs are executed by the electronic device, the electronic device can also perform other steps described in the above embodiment.

Computer program codes for performing operations of the present disclosure may be written in one or more programming languages or their combinations, comprising but not limited to object-oriented programming languages, such as Java, Smalltalk, C++, and conventional procedural programming languages, such as "C" language or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, comprising a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

Units involved in the embodiment described in the present disclosure can be realized by software or hardware. Wherein, names of units do not constitute limitation of the units themselves in some cases.

Functions described above herein may be at least partially performed by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, device or apparatus. The machine-readable medium may be a machine-readable signal medium or a machine-readable storage medium. A machine-readable medium may comprise, but is not limited to, an electronic, magnetic, optical, electromagnetic, infrared, or semiconductor system, device or apparatus, or any suitable combination of the above. More specific examples of the machine-readable storage medium may comprise an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage apparatus, a magnetic storage apparatus, or any suitable combination of the above.

According to one or more embodiments of the present disclosure, the present disclosure provide a shooting method, comprising: displaying a first preset interface in response to a first trigger operation for a preset control on a first shooting page, the first preset interface comprising a plurality of first template identifiers and a first shooting control; in response to a second trigger operation on a target template identifier, applying a shooting template associated with the target template identifier to the shooting object to display a preview effect corresponding to the shooting template on the first shooting page, wherein the second trigger operation acts on the target template identifier selected from the plurality of first template identifiers; in response to an operation on the first shooting control, hiding the first preset interface, displaying a second shooting page, and displaying a timing identifier on the second shooting page; when the timing identifier is updated to a preset identifier, shooting the shooting object based on the shooting template.

According to one or more embodiments of the present disclosure, in the shooting method provided by the present disclosure, in some embodiments, a display area of the first shooting control on the first preset interface is different from a display area of the plurality of first template identifiers on the first preset interface, so as to avoid the first shooting control from obscuring the first template identifiers.

According to one or more embodiments of the present disclosure, in the shooting method provided by the present disclosure, in some embodiments, a background of the display area of the plurality of first template identifiers on the first preset interface is transparent.

According to one or more embodiments of the present disclosure, in the shooting method provided by the present disclosure, in some embodiments, the first shooting control is associated with first preset prompt information.

According to one or more embodiments of the present disclosure, in the shooting method provided by the present disclosure, in some embodiments, if the shooting mode is a segmented shooting mode, after shooting the shooting object based on the shooting template, the method further comprises: in response to a third trigger operation for a preset control on the first shooting page, displaying a second preset interface on the first shooting page, wherein the second preset interface comprises a plurality of second template identifiers and a second shooting control, and the second shooting control is associated with second preset prompt information which is different from the first preset prompt information.

According to one or more embodiments of the present disclosure, in the shooting method provided by the present disclosure, in some embodiments, the shooting template comprises at least description information of the shooting object.

According to one or more embodiments of the present disclosure, in the shooting method provided by the present disclosure, in some embodiments, the shooting template further comprises at least one of an audio resource or an interactive resource.

According to one or more embodiments of the present disclosure, in the shooting method provided by the present disclosure, in some embodiments, the applying the shooting template associated with the target template identifier to the shooting object to display a preview effect corresponding to the shooting template on the first shooting page, comprises: editing the shooting object according to an image editing operation configured by the shooting template to make the shooting object edited present an image editing effect corresponding to the shooting template.

According to one or more embodiments of the present disclosure, in the shooting method provided by the present disclosure, in some embodiments, the method further comprises:
when the shooting object is detected to appear on the first shooting page, determining an attribute feature of the shooting object; determining the plurality of first template identifiers based on the attribute feature of the shooting object.

According to one or more embodiments of the present disclosure, the present disclosure provides a shooting apparatus, comprising: a first displaying module configured to display a first preset interface in response to a first trigger operation for a preset control on a first shooting page, the first preset interface comprising a plurality of first template identifiers and a first shooting control; a processing module configured to, in response to a second trigger operation on a target template identifier, apply a shooting template associated with the target template identifier to the shooting object to display a preview effect corresponding to the shooting template on the first shooting page, wherein the second trigger operation acts on the target template identifier selected from the plurality of first template identifiers; a second displaying module configured to, in response to an operation on the first shooting control, hide the first preset interface, display a second shooting page, and display a timing identifier on the second shooting page; a shooting module configured to, in response to the timing identifier being updated to a preset identifier, shoot the shooting object based on the shooting template.

According to one or more embodiments of the present disclosure, the present disclosure provides an electronic device, comprising: one or more processors; a memory for storing one or more programs; when the one or more programs are executed by the one or more processors, the one or more processors are caused to realize any of the shooting methods according to the present disclosure.

According to one or more embodiments of the present disclosure, the present disclosure provides a non-transitory computer-readable storage medium, on which a computer program is stored, and the computer program, when executed by a processor, realizes any of the shooting methods according to the present disclosure.

The above description is only the preferred embodiments of the present disclosure and the explanation of the applied technical principles. It should be understood by those skilled in the art that the disclosed scope involved in the present disclosure is not limited to technical solutions formed by specific combinations of the above technical features, but also covers other technical solutions formed by any combinations of the above technical features or their equivalent features without departing from the above disclosed concept, such as technical solutions formed by replacing the above features with (but not limited to) technical features with similar functions disclosed in the present disclosure.

Furthermore, although operations are depicted in a particular order, this should not be understood as requiring that these operations be performed in the particular order shown or in a sequential order. In a determined circumstance, multitasking and parallel processing may be advantageous. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical actions, it should be understood that the subject matter defined in the appended claims is not necessarily limited to the specific features or actions described above. On the contrary, specific features and actions described above are only exemplary forms of implementing the claims.

What is claimed is:

1. A shooting method, comprising:
    displaying a first preset interface, in response to a first trigger operation for a preset control on a first shooting page, the first preset interface comprising a plurality of first template identifiers and a first shooting control;
    applying, in response to a second trigger operation on a target template identifier, a shooting template associated with the target template identifier to a shooting object to display a preview effect corresponding to the shooting template, wherein the second trigger operation acts on the target template identifier selected from the plurality of first template identifiers;
    hiding the first preset interface, displaying a second shooting page, and displaying a timing identifier on the second shooting page, in response to an operation on the first shooting control; and
    shooting the shooting object based on the shooting template, in response to the timing identifier being updated to a preset identifier.

2. The shooting method according to claim 1, wherein a display area of the first shooting control on the first preset interface is different from a display area of the plurality of first template identifiers on the first preset interface, and the first shooting control does not obscure any of the plurality of first template identifiers.

3. The shooting method according to claim 1, wherein a background of a display area of the plurality of first template identifiers on the first preset interface is transparent.

4. The shooting method according to claim 1, wherein the first shooting control is associated with first preset prompt information.

5. The shooting method according to claim 4, wherein the first preset prompt information is configured to prompt a user to enter a shooting state by triggering the first shooting control.

6. The shooting method according to claim 4, further comprising, in response to a shooting mode is a segmented shooting mode, after the shooting the shooting object based on the shooting template:
    displaying a second preset interface, in response to a third trigger operation for a preset control on the first shooting page, the second preset interface comprising a plurality of second template identifiers and a second shooting control, and the second shooting control being associated with second preset prompt information which is different from the first preset prompt information.

7. The shooting method according to claim 6, wherein the second preset prompt information is configured to prompt a user to continue shooting by triggering the second shooting control.

8. The shooting method according to claim 1, wherein the applying the shooting template associated with the target template identifier to the shooting object to display the preview effect corresponding to the shooting template on the first shooting page comprises:
    editing the shooting object according to an image editing operation configured by the shooting template to make the shooting object edited present an image editing effect corresponding to the shooting template.

9. The shooting method according to claim 1, wherein the plurality of first template identifiers are determined based on the shooting object displayed on the first shooting page, and the shooting method further comprises:
    determining an attribute feature of the shooting object, in response to the shooting object being detected to appear on the first shooting page; and
    determining the plurality of first template identifiers based on the attribute feature of the shooting object.

10. The shooting method according to claim 9, wherein the attribute feature comprises a category to which the subject belongs.

11. The shooting method according to claim 1, wherein the shooting template comprises description information of the shooting object, and the description information comprises at least one of a name or attribute information of the shooting object.

12. The shooting method according to claim 1, wherein the shooting template further comprises at least one of an audio resource, a prop resource or an interactive resource.

13. An electronic device, comprising:
    one or more processors; and
    a storage device configured to store one or more programs;
    when the one or more programs are executed by the one or more processors, the one or more processors are caused to realize a shooting method comprising:
    displaying a first preset interface, in response to a first trigger operation for a preset control on a first shooting page, the first preset interface comprising a plurality of first template identifiers and a first shooting control;
    applying, in response to a second trigger operation on a target template identifier, a shooting template associated with the target template identifier to a shooting object to display a preview effect corresponding to the shooting template, wherein the second trigger operation acts on the target template identifier selected from the plurality of first template identifiers;
    hiding the first preset interface, displaying a second shooting page, and displaying a timing identifier on the second shooting page, in response to an operation on the first shooting control; and shooting the shooting object based on the shooting template, in response to the timing identifier being updated to a preset identifier.

14. The electronic device according to claim 13, wherein a display area of the first shooting control on the first preset interface is different from a display area of the plurality of first template identifiers on the first preset interface, and the first shooting control does not obscure any of the plurality of first template identifiers.

15. The electronic device according to claim 13, wherein a background of a display area of the plurality of first template identifiers on the first preset interface is transparent.

16. The electronic device according to claim 13, wherein the first shooting control is associated with first preset prompt information.

17. The electronic device according to claim 16, wherein the first preset prompt information is configured to prompt a user to enter a shooting state by triggering the first shooting control.

18. The electronic device according to claim 16, wherein the one or more processors are caused to implement a following step, in response to a shooting mode is a segmented shooting mode, after the shooting the shooting object based on the shooting template:

displaying a second preset interface, in response to a third trigger operation for a preset control on the first shooting page, the second preset interface comprising a plurality of second template identifiers and a second shooting control, and the second shooting control being associated with second preset prompt information which is different from the first preset prompt information.

19. The electronic device according to claim 18, wherein the second preset prompt information is configured to prompt a user to continue shooting by triggering the second shooting control.

20. A non-transitory computer-readable storage medium, on which a computer program is stored, and the computer program, when executed by a processor, realizes a shooting method comprising:

displaying a first preset interface, in response to a first trigger operation for a preset control on a first shooting page, the first preset interface comprising a plurality of first template identifiers and a first shooting control;

applying, in response to a second trigger operation on a target template identifier, a shooting template associated with the target template identifier to a shooting object to display a preview effect corresponding to the shooting template, wherein the second trigger operation acts on the target template identifier selected from the plurality of first template identifiers;

hiding the first preset interface, displaying a second shooting page, and displaying a timing identifier on the second shooting page, in response to an operation on the first shooting control; and shooting the shooting object based on the shooting template, in response to the timing identifier being updated to a preset identifier.

* * * * *